United States Patent
Brokken et al.

(10) Patent No.: US 9,612,654 B2
(45) Date of Patent: Apr. 4, 2017

(54) CONTROLLING AN INFLUENCE ON A USER IN A RENDERING ENVIRONMENT

(75) Inventors: Dirk Brokken, Eindhoven (NL); Tim Johannes Willem Tijs, Sint-Oedenrode (NL); Joris Hendrik Janssen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 632 days.

(21) Appl. No.: 13/124,250

(22) PCT Filed: Oct. 19, 2009

(86) PCT No.: PCT/IB2009/054591
§ 371 (c)(1),
(2), (4) Date: Apr. 14, 2011

(87) PCT Pub. No.: WO2010/046834
PCT Pub. Date: Apr. 29, 2010

(65) Prior Publication Data
US 2011/0207100 A1 Aug. 25, 2011

(30) Foreign Application Priority Data

Oct. 20, 2008 (EP) .................................. 08167040
Mar. 2, 2009 (EP) .................................. 09154104

(51) Int. Cl.
G06F 3/01 (2006.01)
G06F 3/048 (2013.01)
A63F 13/00 (2014.01)

(52) U.S. Cl.
CPC .............. *G06F 3/011* (2013.01); *G06F 3/015* (2013.01); *G06F 2203/011* (2013.01)

(58) Field of Classification Search
CPC .............. A63F 2300/1012; A63F 13/06; A63F 2250/265; A63F 13/10; A63F 13/12;
(Continued)

(56) References Cited

U.S. PATENT DOCUMENTS 4,412,288 A * 10/1983 Herman ........................ 600/342
4,571,682 A * 2/1986 Silverman et al. ........... 600/301
(Continued)

FOREIGN PATENT DOCUMENTS

WO 2007121372 A2 10/2007

OTHER PUBLICATIONS

Tijs, T., et al. Creating an emotionally adaptive game. Sep. 2008. Entertainment Computing—ICEC 2008, 122-133.*
(Continued)

*Primary Examiner* — Nathan Hillery (57) ABSTRACT

A method of controlling an influence on a user in a rendering environment includes obtaining signal data representing one or more physiological conditions of a user in response to an influence caused by system feedback of the rendering environment; obtaining data corresponding to a user's desired emotional state, which data is based on the user's self-reports and data representative of accompanying signal data representing one or more physiological conditions of the user over a last period before the accompanying self-report; determining whether the desired emotional state is reached; and if the state is not reached, adapting the system feedback provided by the rendering environment correspondingly.

15 Claims, 5 Drawing Sheets

(58) Field of Classification Search
CPC ...... A63F 2009/2402; A63F 2009/2408; A63F 2009/243; A63F 2009/2436; A63F 2250/26; A63F 2300/105; A63F 2300/407; A63F 2300/6009; A63F 2300/61; A63F 2300/69; A63F 9/18; A63F 9/183; A63F 9/24; A61B 5/02; A61B 5/0205; A61B 5/021; A61B 5/024; A61B 5/486; A61B 5/6814; A61B 5/6843; A61B 5/7264; A61B 5/7267; G06F 3/011; G06F 19/3431; G06F 3/015; H04N 21/42201
USPC .......................................... 434/236; 463/37
See application file for complete search history.

(56) References Cited

U.S. PATENT DOCUMENTS

| | | | | |
|---|---|---|---|---|
| 4,683,891 | A * | 8/1987 | Cornellier | A61B 5/0533 128/905 |
| 5,209,494 | A * | 5/1993 | Spector | 273/460 |
| 5,676,138 | A * | 10/1997 | Zawilinski | A61B 3/113 128/905 |
| 5,938,531 | A * | 8/1999 | Yasushi et al. | 463/36 |
| 6,496,724 | B1 * | 12/2002 | Levendowski et al. | 600/544 |
| 6,662,032 | B1 * | 12/2003 | Gavish | A61B 5/1135 600/300 |
| 2002/0143241 | A1 * | 10/2002 | Thorell | 434/236 |
| 2002/0183646 | A1 * | 12/2002 | Stivoric | A61B 5/0008 600/549 |
| 2003/0139654 | A1 * | 7/2003 | Kim | A61B 5/02405 600/300 |
| 2003/0167908 | A1 * | 9/2003 | Nishitani et al. | 84/723 |
| 2003/0174122 | A1 | 9/2003 | Dinges et al. | |
| 2003/0195040 | A1 * | 10/2003 | Breving | 463/37 |
| 2004/0229692 | A1 * | 11/2004 | Breving | 463/36 |
| 2004/0230105 | A1 * | 11/2004 | Geva | A61B 5/04012 600/301 |
| 2005/0223237 | A1 | 10/2005 | Barletta et al. | |
| 2007/0022074 | A1 * | 1/2007 | Muramatsu et al. | 706/50 |
| 2007/0149282 | A1 * | 6/2007 | Lu et al. | 463/36 |
| 2007/0207858 | A1 * | 9/2007 | Breving | 463/36 |
| 2008/0081692 | A1 * | 4/2008 | Pope et al. | 463/31 |
| 2008/0167535 | A1 * | 7/2008 | Stivoric | G01R 29/0814 600/301 |
| 2008/0177197 | A1 * | 7/2008 | Lee et al. | 600/545 |
| 2008/0214903 | A1 * | 9/2008 | Orbach | 600/301 |
| 2008/0276186 | A1 | 11/2008 | Feduszczak et al. | |
| 2009/0024475 | A1 * | 1/2009 | Pradeep et al. | 705/14 |
| 2009/0069707 | A1 * | 3/2009 | Sandford | 600/545 |
| 2010/0056276 | A1 * | 3/2010 | Silberstein | 463/36 |
| 2010/0069780 | A1 * | 3/2010 | Schuette et al. | 600/547 |

OTHER PUBLICATIONS

Van Den Broek et al: "Prerequisites for Affective Signal Processing (ASP)"; International Conference on Bio-Inspired Systems and Signal Processing, Biosignals, 2009, pp. 426-433.

Saari et al: "Emotional Regulation System for Emotionally Adapted Games";Proceedings of Futureplay 2005 Conference, 8 Page Document.

* cited by examiner

CONTROLLING AN INFLUENCE ON A USER IN A RENDERING ENVIRONMENT

FIELD OF THE INVENTION

The invention relates to a method of controlling an influence on a user in a rendering environment. The invention also relates to an apparatus for controlling an emotionally adaptive system.

The invention also relates to a computer program.

BACKGROUND OF THE INVENTION

Saari, T. et al., "Emotional regulation system for emotionally adapted games", *Proceedings of FuturePlay 2005 conference*, 13.-15.10. 2005, Michigan State University, USA relates to an approach to build emotionally adapted games based on a user-controlled emotional regulation system. It discloses a system design for including emotional regulation in a gaming engine. The engine continuously monitors user input. This input data is then processed and transferred to the layer that handles the game's internal logical state. The proposed emotional regulation can be implemented as a middleware system that runs in parallel to the actual game engine. The input processing layer of the game engine can receive a data flow of captured and pre-processed biofeedback sensor data. The real-time signal processing may consist of different forms of amplifying, filtering and feature selection on the biofeedback signals. This data flow may directly influence the state of the game world, or it can be used by the emotional regulation sub-module of the emotion feedback engine. This module consists of the rules of emotional balancing for different player profile types and game-related explicitly set preferences controlled by an "emotion knob". The output of the emotional regulation engine may then be applied to various different levels of the actions of the game engine:

i) the logical state of the world may be re-directed,
ii) the actions of the synthetic agents may be controlled,
iii) the kinetics of the game may be altered and
iv) the rendering of the game world may be changed. The first two options are more related to high-level and story-related structures of the game, whereas the last two are more directly related to the selection of presentation of objects within the virtual environment.

A problem of the known system is that it is too simplistic to assume a player's emotional response based on physiological and performance-related parameters, because every player is different and players differ with respect to skills, preferences and emotional responses over time.

SUMMARY OF THE INVENTION

It is desirable to provide a method, apparatus and computer program for implementing an emotionally adaptive system that tailors the level of system feedback to the individual user such as to bring the user in a desired mental state.

This is achieved by the method according to the invention, which comprises:
  obtaining signal data representing one or more physiological conditions of a user in response to an influence caused by system feedback of the rendering environment;
  obtaining data corresponding to a user's desired emotional state, which step may, for example, comprise obtaining the user's self-reports and data representative of accompanying signal data representing one or more physiological conditions of the user over a last period before the accompanying self-report;
  determining whether the desired emotional state is reached; and
  if the state is not reached, adapting the system feedback provided by the rendering environment correspondingly.

The method is based on the insight that different users are brought into different mental states by a particular level of a particular aspect of system feedback, that this relation is also time-dependent, and that a particular mental state can be characterized by different signals representing one or more physiological conditions of the user (hereinafter: emotion signals) for different users and over time. By obtaining the user's self-reports and data representative of accompanying emotion signals over a last period before the accompanying self-report, the method obtains data that link mental states to emotion signal values. Thus, a control loop that uses the emotion signal(s) as input can be implemented to control the emotional state of the user. By contrast, the prior methods merely control the emotion signal itself, whereby the user may set (static) limits. In the gaming domain, the method recognizes that adapting the working of a game based on in-game (performance-related) data, in order to optimize the player's enjoyment is too simplistic. This is because many different types of players exist: Achievers, Explorers, Socializers and Killers. Different players have different skills, preferences and emotional responses when playing games. Not every player enjoys an optimal performance/challenge level. Therefore the method recognizes the need to measure the player's emotional responses, and that a player's interpretation of the data is required for success. In so doing, the method allows one to take account of multiple dimensions of emotionality, one common model being based on the dimensions valence and arousal. Valence information is provided by the user's self-reports, whereas arousal information is comprised in the emotion signals. An alternative selection of one or more dimensions determined by signal data and one or more dimensions determined by users' self-reports is possible.

In the present context, emotion signals are signals that enable an inference of a user's physiological state to be made, which are independent of performance-related parameters (in the case of a gaming environment) or, generally, of the explicit user input information provided to the system implementing the rendering environment. Emotional states include mental states representative of stress and a high workload.

In an embodiment of the method, the data corresponding to a user's desired emotional state include thresholds corresponding to switch points at which the user switches between emotional states.

An effect is that both the extent and the location of an emotional state relative to feedback levels are represented by the data. Closed loop control based on such data is more stable, because fewer adjustments are required to stay within the state as represented by the "model of the user" that is established by the data. The method takes account of the fact that some users may be relatively impervious to changes in the level of a particular aspect of feedback. If that is the case, then adjustments in feedback level for that aspect need be made less frequently. Especially in embodiments in which the apparatus implementing the method switches state in response to e.g. user feedback, the number of switches may be reduced if the feedback level is kept in the middle of the range corresponding to the desired emotional state. Establishing thresholds allows one to find the middle of this range. When a change in state is actually desired, then having thresholds for each aspect of system feedback allows one to select the appropriate aspect to change, for example the one for which at least one threshold is closest to the current level.

In an embodiment, at least in a calibration mode, the user's self-reports and data representative of accompanying signal data representing one or more physiological conditions of the user over a last period before the accompanying self-report are obtained and a level of at least one dimension of the system feedback is constantly changed.

Thus, in this mode, one is able to find the boundaries of an emotional state by going through a range of feedback levels, rather than staying at the first level that corresponds to the desired emotional state.

In a variant of this embodiment, a next level of at least one dimension of the system feedback is selected from a scanning sequence database.

An effect is to avoid repetition of values as the range of feedback level values corresponding to an emotional state is being determined. One can discover the range relatively quickly on the basis of a sequence representing a suitable and efficient search strategy.

In an embodiment, the user's self-reports and data representative of accompanying signal data representing one or more physiological conditions of the user over a last period before the accompanying self-report are stored in a database.

This allows one to make an accurate model of the user, but also to re-make this model if necessary, based on multiple data points.

In an embodiment, the user's self-reports and data representative of accompanying signal data representing one or more physiological conditions of the user over a last period before the accompanying self-report are obtained in a calibration mode, in which they are used to train at least one classifier for predicting the user's emotional state from at least one signal representing one or more physiological conditions of the user.

An effect is that one need not obtain a large number of self-reports and accompanying signal sections. Signal levels can be measured and an emotional state inferred even if the particular level measured has not previously been encountered.

In an embodiment, the user's self-reports and data representative of accompanying signal data representing one or more physiological conditions of the user over a last period before the accompanying self-report are obtained in a calibration mode, and a switch is effected to an adaptive mode, in which the steps of determining whether the desired emotional state is reached and, if the state is not reached, adapting the system feedback provided by the rendering environment correspondingly are carried out continuously.

An effect is that the user is not prompted for self-reports in the adaptive mode, so that the experience of the system feedback in the rendering environment is uninterrupted.

A variant of this embodiment includes remaining in the adaptive mode for as long as no new user's reports are provided.

Thus, as long as the system is able to keep the user in the desired emotional state, the user's experience of the rendering environment is uninterrupted. An indication from the user that the level of system feedback is no longer correct triggers a switch to a calibration mode, in which the ranges of system feedback levels corresponding to a desired emotional state are re-established. This method takes account of the fact that a user of a gaming environment may learn over time, and that users of a rendering environment can generally become used to, or even bored by, particular levels of feedback. The user is able to signal this, whereupon the environment is adapted.

According to another aspect of the invention, there is provided an apparatus for controlling an emotionally adaptive system, the apparatus including:
   an input/output unit for obtaining signal data representing one or more physiological conditions of a user in response to an influence caused by system feedback of the rendering environment;
   a processor for implementing an algorithm; and
   memory for a database, the algorithm enabling the apparatus to:
   obtain data corresponding to a user's desired emotional state, which data may optionally be based on the user's self-reports and data representative of accompanying signal data representing one or more physiological conditions of the user over a last period before the accompanying self-report;
   determine whether the desired emotional state is reached; and
   if the state is not reached, adapt the system feedback provided by the rendering environment correspondingly.

The apparatus may be configured to carry out a method according to the invention.

According to another aspect of the invention, there is provided an emotionally adaptive system, comprising products for rendering feedback effects and an apparatus according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
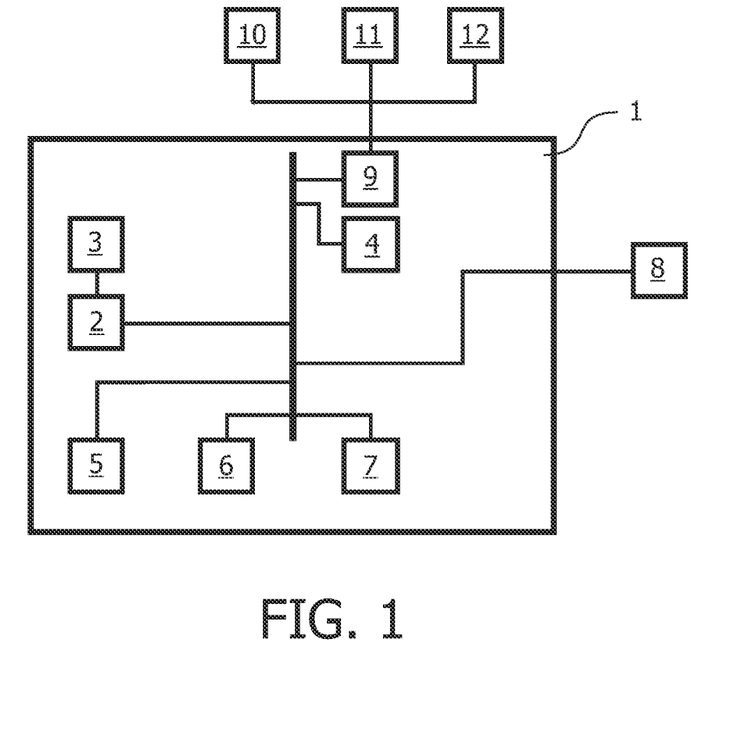
FIG. 1 is a schematic block diagram of a system comprising products for rendering feedback effects and an apparatus for controlling the system.

FIG. 1 illustrates in outline a generic emotionally adaptive system 1 including one or more rendering products and a control apparatus. The system includes a processor 2, main memory 3, a further memory unit 4 for hosting one or more database, at least one input unit 5, at least one user input device 6, a display device 7 and an input/output unit 8 for obtaining emotion signal data representing one or more physiological conditions of a user in response to an influence caused by system feedback of the rendering environment provided by the emotionally adaptive system 1. The system 1 further includes an interface 9 to external rendering devices 10-12.

The proposed system architecture and functionality may be applied to a wide range of emotionally adaptive products, e.g.:

Computer gaming systems;
Home theatre systems (both for movies and TV programs);
Atmosphere creation products: for instance, for Philips Living Colors products, emotion signals can be gathered e.g. by integrating sensors in the furniture of the (living) room and by means of a wireless device (e.g. bracelet measuring heart rate and skin conductance);
Photoframes; and
Music players.

The processor 2 may be a well-known central processing unit (CPU) suitably arranged to implement the emotionally adaptive system 1 and enable the operation of the device as explained herein.

The main memory 3 may be a known RAM (random access memory) memory module. The processor 2 may be arranged to read from the main memory 3 at least one instruction to enable the functioning of the device 1.

The processor 2 is coupled to the input unit 5 for obtaining media content by recording the media content, receiving the media content, etc. Depending on the implementation, the input unit 5 will comprise a photo camera for taking pictures, a video camera for shooting a film, a personal video recorder (PVR), a TV tuner, a computer equipped with a network card for connecting the computer to a data network, or any other device suitable for obtaining the media content. In one embodiment, for example, the input unit 5 receives video data in a known manner from a video content broadcaster, e.g. using digital video broadcasting (DVB) specifications, video on demand systems, Internet radio systems, etc.

The user input device 6 will generally comprise at least a keyboard, e.g., a well-known QWERTY computer keyboard and a pointing device and possibly a remote control unit. For example, the pointing devices are available in various forms such as a computer (wireless) mouse, light pen, touchpad, joystick, light-pen, trackball, etc.

The display device 7 may be any conventional means for presenting video information to the user, for example, a CRT (cathode ray tube), LCD (Liquid Crystal Display), LCOS (Liquid Crystal on Silicon) rear-projection technology, DLP (Digital Light Processing) television/Projector, Plasma Screen display device, etc.

The media content/content item/document processed by the emotionally adaptive system 1 comprises at least one of, or any combination of, visual information (e.g., video images, photographs or graphics), audio information, text information, and other digital data such, e.g., meta-data according to the MPEG-7 standard. Such meta-data may be used to describe and search digitized materials by means of sampling, as well as by using lexical search terms. The media content may be stored on different data carriers such as an audio or video tape, an optical storage discs, e.g., a CD-ROM disc (Compact Disc Read Only Memory) or a DVD disc (Digital Versatile Disc), floppy and hard-drive disk, etc, in any format, e.g., MPEG (Motion Picture Experts Group), MIDI (Musical Instrument Digital Interface), Shockwave, QuickTime, WAV (Waveform Audio), etc.

The processor 2 is configured to execute a software program to enable the execution of the steps of the method outlined herein. In one embodiment, the software enables the apparatus comprised in the emotionally adaptive system 1 independently of where it is being run. To enable the apparatus, the processor 2 may cause the software program to be transmitted to the other (external) devices 10-12. These external devices 10-12 are connected to the processor 2 through the interface 9 using an existing technology, such as Bluetooth, IEEE 802.11[a-g], etc. In one embodiment, the processor 2 interacts with the external device in accordance with the UPnP (Universal Plug and Play) standard.

Figure 2:
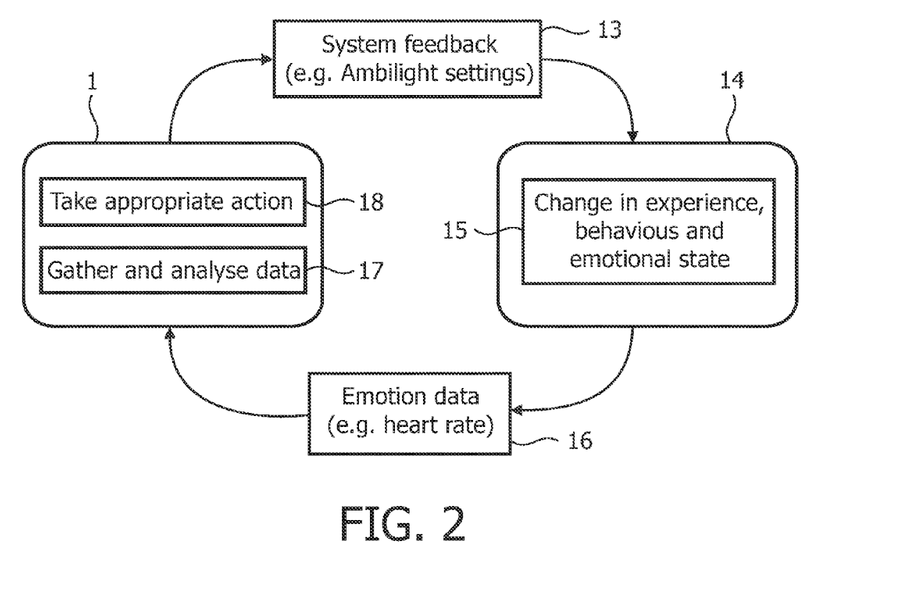
FIG. 2 is a conceptual diagram of a system with an emotional adaptation loop.

Ideally, an entertainment product continuously adapts its working to the present user. Since emotions play an important role in the user-product interaction, entertainment products should become emotionally adaptive, i.e. continuously adjust their working to the user's emotional state/responses, in order to optimize the experience. As a first step towards personalized experiences, many manufacturers nowadays make their products customizable (e.g. a mobile phone of which the keypad colors can easily be changed by a user). A logical next step will be product-adaptability:

Instead of a user changing the product's behavior (working, looks, etc.) before or after usage (i.e. offline), the product will change its own behavior continuously during usage (i.e. online), as shown in FIG. 2. In FIG. 2, the emotionally adaptive system 1 provides system feedback 13 in the form of settings for various devices forming a rendering environment to a user 14. This feedback brings about a change 15 in experience, behavior and emotional state of the user. The change 15 manifests itself as changes in measurable parameters, also referred to herein as emotion data 16, which are provided as input to the system 1. The emotionally adaptive system 1 gathers and analyses the data (step 17) and takes appropriate action (step 18) in the form of an adjustment of the settings of the products for providing the system feedback 13.

Regarding system feedback, a number of product features can be adapted, such as audio, visual and haptic effects. Regarding emotion data, a large number of emotion measurement techniques are possible.

In the methods outlined herein, we distinguish between emotion signals (measured continuously, such as heart rate, skin conductance level and keyboard pressure) and user reports (provided every now and then by the user). Emotion signals are measured passively, in that they require no cognitive effort from the user. User reports are provided actively, in that they require cognitive effort from the user as well as active input.

A specific implementation of the emotionally adaptive system 1 is based on a selection of signals related to emotions and on an application-specific model.

Emotion signals according to one embodiment comprise signals representative of physiological responses. Measured parameters include one or more of the blood volume pulse level, the blood volume pulse amplitude, the heart rate, the heart rate variability, the respiration level (i.e. relative chest volume), respiration rate, respiration-heart rate coherence, skin conductance level, number of skin conductance responses (per unit time) and muscle activity or amplitude (e.g. of the corrugator supercilii or zygomaticus major). Heart rate variability is quite closely correlated to emotional responses for most people. Emotion signals according to another embodiment additionally or alternatively include parameters representative of haptic responses. A suitable parameter to measure is the keyboard pressure. Emotion signals in yet another embodiment additionally or alternatively measure behavioral responses, e.g. by video analysis, such as to characterize movement, in particular unconscious movement unrelated to the system feedback or the logic behind the content being rendered. The degree of fidgeting by the user can be quantified, for example.

The choice of emotion signals comes down to the question of how to measure the user's emotional state given the current application context. Emotional states and responses depend on the application. Different application behavior evokes different emotional responses. The usefulness of different emotion signals should be assessed for the application under development. For instance, in a computer game, keyboard pressure may be useful, but for a home entertainment system this cannot be used. Therefore, as a first preparation step, one should investigate the most promising emotion signals given the targeted application context. Furthermore, it should be investigated how the user can easily provide the system with user reports (which are further explained below).

Another aspect of the implementation of the emotionally adaptive system 1 concerns the type of system feedback:

How should the system 1 respond to (changes in) the user's emotional state?

Figure 3:
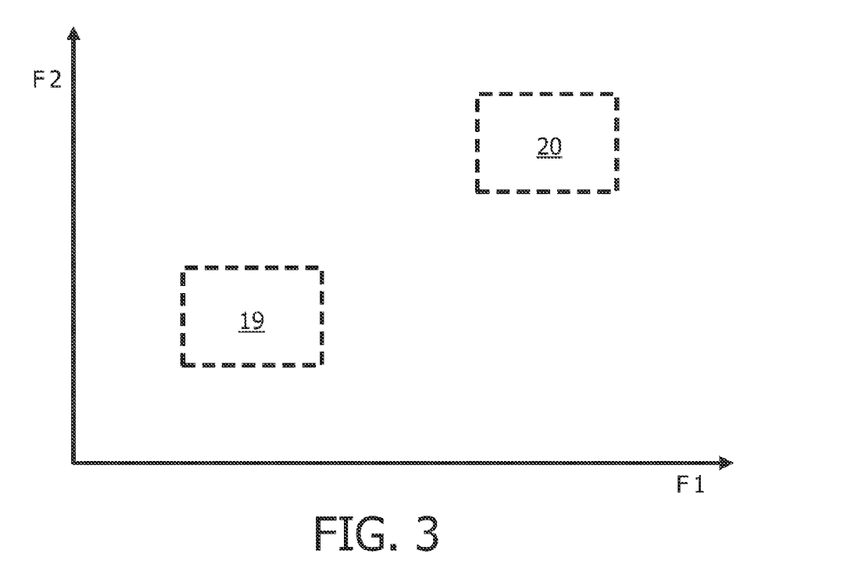
FIG. 3 is a schematic diagram illustrating a user-product interaction model.

Many user-product interaction scenarios are expected to have a generic form as displayed in FIG. 3. The dotted lines represent the borders of an individual's desired emotional state (the optimal product experience). As an example, in FIG. 3, two feedback features $F_1, F_2$, also referred to herein as dimensions of the system feedback, are used for adaptation. Two optimal feedback settings (areas 19,20) are shown. In theory however, there can be any number of dimensions of system feedback that are adapted, and there can be a different number of areas corresponding to optimal feedback settings.

As a next implementation step, it is necessary to create an application-specific interaction model from this generic user-system interaction model (FIG. 3). For creating the application-specific model, the type of system feedback needs to be decided upon. For instance, in a home theatre environment, we can think of optimizing the volume or intensity of Ambilight effects. In a gaming example, game speed might be used as a feedback parameter to be adapted.

When the preparatory steps have been taken, the suitable emotion signals and application-specific model may be integrated into a system architecture. The proposed system works as described below with reference to the flow chart of FIG. 4.

During product usage, the user's emotion signals are measured continuously.

Figure 4:
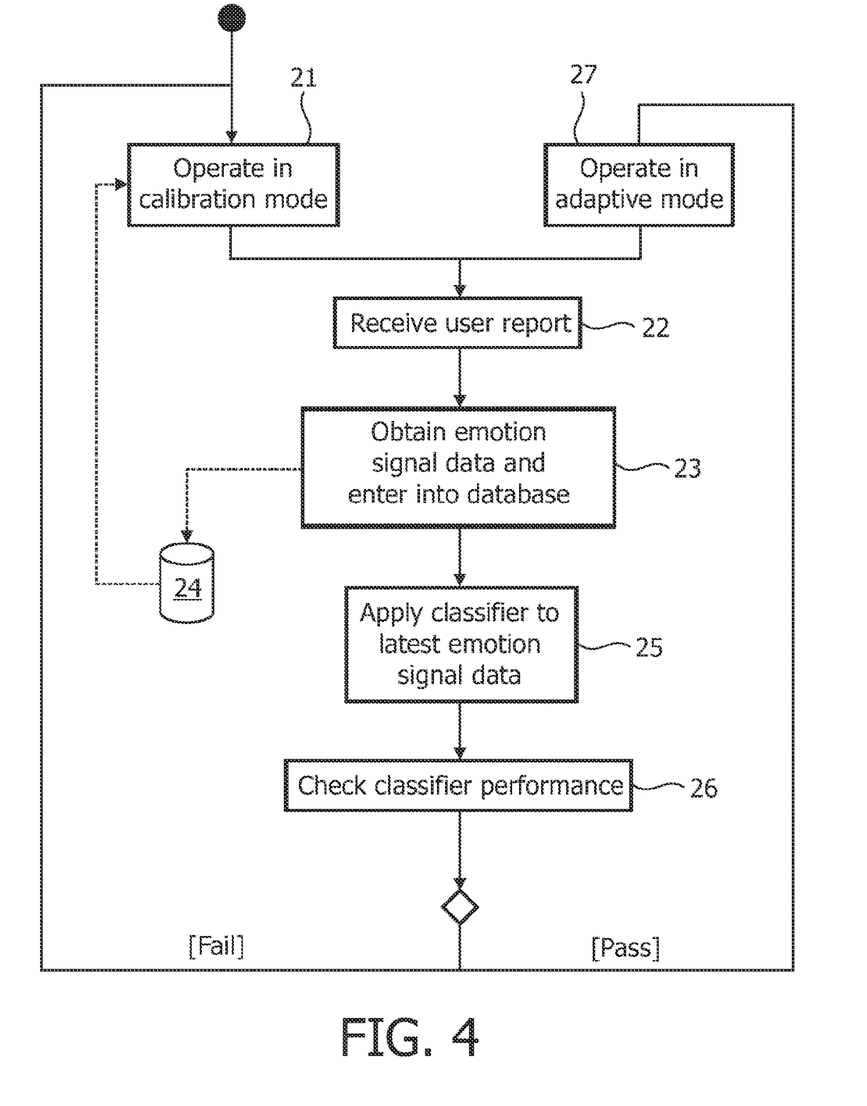
FIG. 4 is a flow chart of a method of controlling an influence on a user in a rendering environment.

Initially, the system 1 is in the calibration mode (step 21), during which the level of system feedback constantly changes, e.g. increases or decreases in feedback. Alternatively, the system could offer discrete levels of feedback, going in discrete (e.g. 10, 30, 60, 30, 10), potentially random (e.g. 10, 100, 20, 30, 95) steps through levels.

These changes may be controlled by user reports that the system receives (step 22). Any single feedback dimension (e.g., the two effects as mentioned in FIG. 3) can be changed independently of the other. For every dimension, this is gone through, two "explicit" user-report types: "I find this too much" and "I find this not enough" can be received. A third state, "this is ok", is derived from the two user reports; we assume the existence of this state during the moment that lies in between a too much and too little report, because the user probably liked the system feedback level. Otherwise (s)he would have reported so. Alternatively, the user could be offered either just one ('experience OK' or 'experience BAD') feedback control, or many. In fact, any number of feedback controls (one or larger) could be implemented, although small numbers will be preferred for usability.

After every user report, this user report plus the accompanying emotion signals are stored (step 23) in a database 24 (e.g. storage of the mean values of heart rate and keyboard pressure over the last seconds before that user report). Also, the direction of the system feedback is changed (as part of the step 21 of operating in the calibration mode), for instance from an increasing feedback strength to a decreasing feedback strength (an illustration of this is provided in FIG. 7, to be discussed in more detail below). Alternatively, especially for the 'no continuous feedback alternative' mentioned above, the next system feedback level can be randomly chosen, or selected from a database containing known 'scanning' sequences. Potentially, the next system feedback setting could be selected to avoid repetition of very similar settings, or settings that have already been offered.

After the step 23 comprising storage of the data, at least one classification algorithm tries to classify, i.e. predict, (step 25) the most recent user report of step 22 based on the most recent emotion signals and the data that have previously been entered onto the database 24. This classifier can be based on neural network principles or alternative machine learning techniques known to a person skilled in this field.

Next (step 26), the system checks the classifier's most recent predictions, e.g. the five most recent ones. In case the classifier has an accuracy that meets a minimum threshold (e.g. four out of the last five predictions correct), the next system mode will be the adaptive mode (step 27). If not, the system remains in the calibration mode. It should be stressed that this check can be implemented in a number of ways:

As suggested above, when the previous X trials have shown Y successes (Y being smaller than X);

An automatic switch to adaptive mode after a certain amount of time or interaction events;

Alternatively, the system could periodically switch between calibration and adaptive modes on periodic, preset or randomly selected times.

In the adaptive mode, the system feedback is continuously adapted to the user's present emotion signals. The system remains in the adaptive mode as long as the user does not provide new user reports. If a new user report enters the system, all the above steps 22,23,25,26 are taken again, to see whether the system still has sufficient predictive power. Optionally, the set of stored classification prediction successes could be emptied on receipt of user feedback in the adaptive mode, as this signals that the adaptation was apparently unsuccessful (due to a change in user preference or other causes).

The application of the method of FIG. 4 to two embodiments will be described in the following.

Embodiment 1: Home theatre system

In this embodiment, a home theatre system that includes Ambilight and haptic feedback (through a number of small vibromotors in the user's chair) is envisaged. Ambilight is a lighting technology that allows the emotionally adaptive system 1 to change the ambient lighting conditions, in particular according to the results of an analysis of the audiovisual content being rendered simultaneously. Thus, in this embodiment, the external devices 10,11,12 include lighting devices and tactile feedback devices of the kind mentioned above.

In this application context, the user is expected to sit in a chair, in front of a television. Therefore, the devices 8 for capturing emotion data may be integrated into the chair (e.g. measuring the user's posture, skin temperature and respiration patterns) and television (e.g. a camera that captures the user's facial expressions and pupil diameter). The two user reports "this is too much system feedback" and "this is too little system feedback" can be implemented by two buttons on the home theatre system's remote control, or alternatively in one of the chair's armrests.

The level of Ambilight and haptic effects are used as system feedback parameters to be adapted. These are grouped into different patterns (i.e., Ambilight effects and haptic effects to events in a movie).

The system starts in the calibration mode. This is communicated beforehand to user John. John is told that the system feedback level will start at a minimum level and will increase throughout the movies he watches, until he indicates that the current level of feedback has become too high. From that point onward, the system feedback level will decrease until it reaches a point where he indicates that the level of system feedback has become too low, etc.

Figure 7:
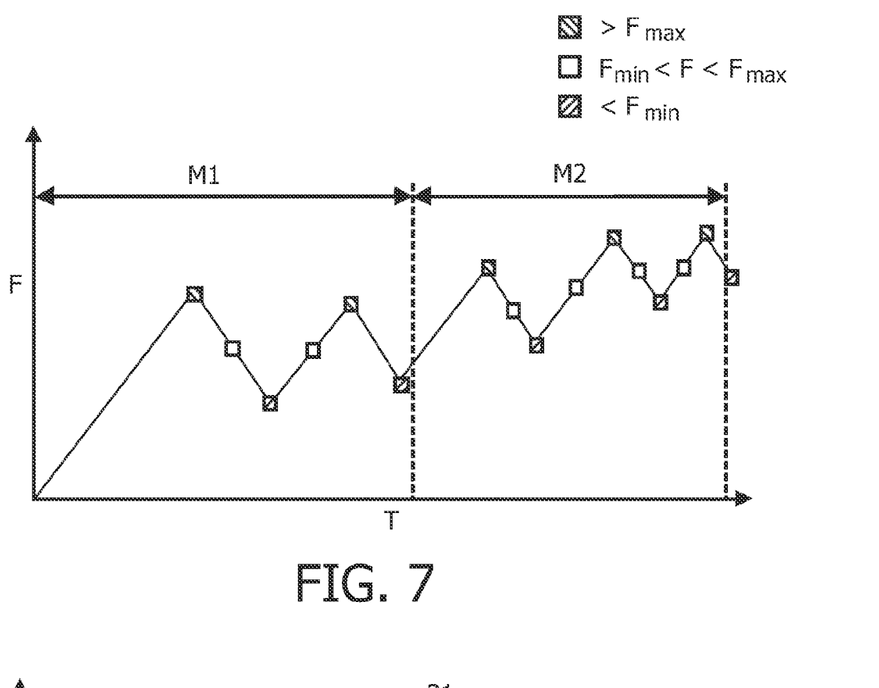
FIG. 7 is a diagram illustrating the development over time of user reports and feedback level as obtained using the method of FIG. 4.

The level F of one dimension of system feedback is illustrated in FIG. 7. A first time interval M1 corresponds to a first movie rendered on the home theatre system. A second time interval M2 corresponds to a second movie rendered on the home theatre system.

The first movie John watches is a scary movie including a number of frightening scenes which are enhanced by the Ambilight and haptic system feedback. The first "enhanced" scene is accompanied by a system feedback patterns at level 1 (i.e., hardly any feedback, since 1=lowest intensity and 100=highest intensity). In case John presses the "too much" button on his remote control, this implies that he finds the minimum level of system feedback already "too much". In that case, John is asked to confirm the turning off of the system feedback functionality. However, John hardly notices the system feedback at level 1 and thus does not press a button. A few scenes further, the system feedback level has increased to level 15. John starts to notice the system feedback but finds it still not enough. After 60 minutes, the system feedback level is at level 65. "Wow, this is cool stuff!", John thinks.

However, at minute 80 in the movie the feedback has increased to level 76. He finds this amount of feedback a bit too overwhelming (distractive) and thus presses the "too much" button. This "too much" report plus John's mean emotion signals over period 79.50-80.00 (i.e. 10 seconds) are stored in a database. The following scenes are accompanied by system feedback at decreasing levels. However, 30 minutes later, the system feedback is at level 50, which John finds not enough, so he presses the "too little" button. This "too little" report plus his emotion signals over period 109.50-110.00 are added to the database 24 (FIG. 4). Besides that, the emotion data over the period right in between his two most recent reports (i.e. period 94.50-95.00) is stored as "this is ok" in the database 24. Since John did not press a button here, it is assumed that he liked the system feedback at this point. After that, the system feedback level starts to increase again.

After the movie, the system estimates the amount of extra data-points needed for accurate classification. A progress bar shows the current amount of data vs. an estimation of the amount of needed data. A couple of days (and a few movies) later, the system has obtained sufficient data for correct classification. From that point onwards, the system applies a feedback level that matches John's current emotion signal values. That is:

When the emotion signals are similar to that of a typical "too much" report of John, the following enhanced movie scenes will be accompanied by a decreased level of system feedback.

When John's emotion signals match his pattern of "too little", the next scenes will have a higher level of feedback.

When his emotion signals match the pattern of "this is ok", the amount of system feedback will remain unchanged. Embodiment :2 Computer Game The embodiment described below has been built and tested in detail by the applicants. The computer game Pac-Man is used as an example embodiment.

The player (call him Jack) sits in a chair, in front of a display device 7 in the shape of a Personal Computer monitor, and plays Pac-Man using the input device 5 (keyboard). Therefore, many emotion signals can be used such as posture, skin temperature, facial expressions, pupil diameter, mouse- and keyboard pressure, etc. The two user reports "this is too much system feedback" and "this is too little system feedback" can be implemented by any pair of keys (of the keyboard) that are not used in the actual game. In this example, the [up] and [down] key of the keypad are used.

Figure 5:
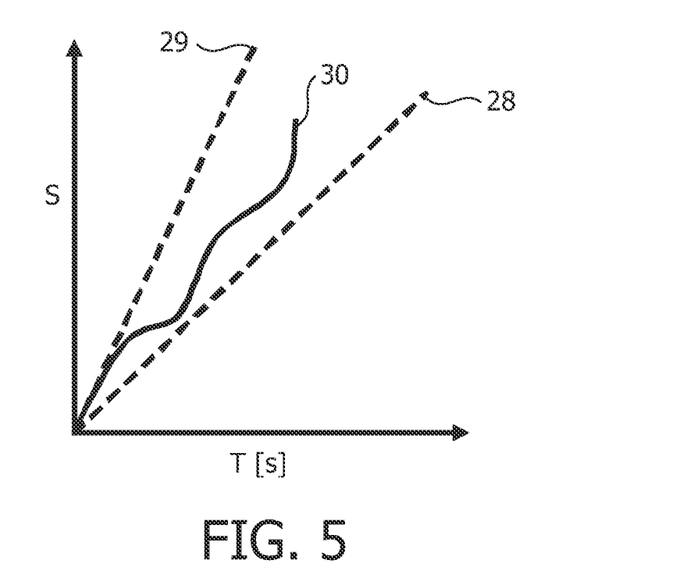
FIG. 5 is a diagram illustrating an example of a user-system interaction model in the form of game speed vs. time.
Figure 6:
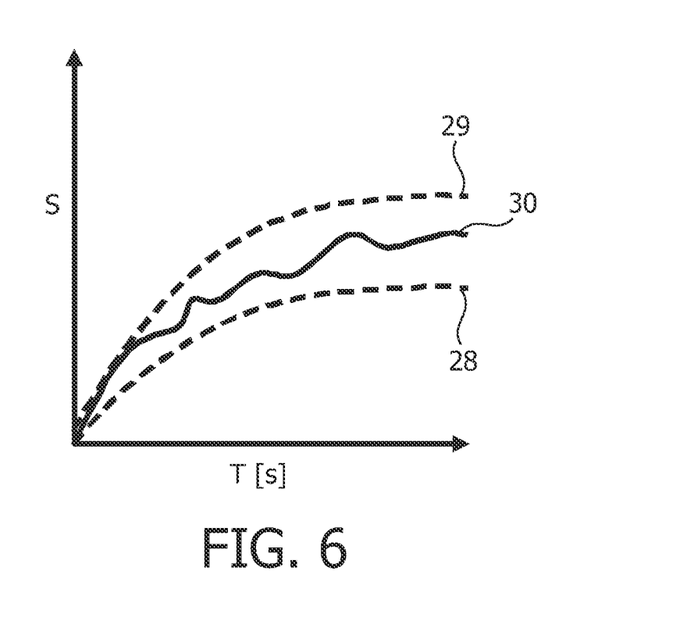
FIG. 6 is diagram corresponding to that of FIG. 5, but over a longer time period.

As shown in FIGS. 5 and 6, the speed S of the game (i.e. the speed of all objects that move) is used as the system feedback parameter to be adapted. In Pac-Man, the game speed S is a variable with levels between 1 (slowest) and 100 (fastest).

Jack is told in a user-friendly way that the game will start in the calibration mode. Before the start of the game, Jack is told that the system feedback level S (game speed) will start at a low level and will increase throughout the game. As soon as the game has become too fast, he can press the [down] key and as soon the game is considered too slow, Jack can press the [up] key to speed up.

The game starts at speed level 15, Jack finds this too slow and therefore presses the [up] key to speed up the game. At minute 7.30, the game has reached speed level 85, which Jack finds too fast ("I'd like a challenging game, but this is too much for me"). Therefore he presses the [down] key. The "slow down" user report plus the accompanying emotion signals over minute 7.20-7.30 are stored in the database 24. Now the game starts to decrease gradually in speed. At minute 10.30, the game has slowed down to level 55. Jack finds this not challenging enough ("this is kinda boring for me") and therefore presses the [up] key, which again lets the game's speed level increase gradually. Again, the "speed up" report plus the emotion signals over minute 10.20-10.30 are stored in the database 24. Besides that, a "this is ok" report is stored with the emotion signals over the period in between the last "slow down" and "speed up" moment (i.e. over minute 8.50-9.00). This calibrating continues for a while. At minute 19.10, Jack presses the [up] key. This user report and the three previous reports are classified (predicted) accurately by the game. Therefore, the game enters the adaptive mode. In this mode, the game's speed level is adapted to Jack's emotion signals:

When the emotion signals are similar to that of a typical "too fast" report of Jack, the game's speed level will gradually decrease.

When Jack's emotion signals match his pattern of "too slow", game speed will gradually increase.

When Jack's emotion signals match the pattern of "this is ok", game speed will remain unchanged.

After five minutes of play in the adaptive mode, Jack notices he hasn't changed the game speed for a while. "However", Jack concludes, "there is also no need for changing the speed level because I simply like it like this". After 30 minutes Jack decides to save and quit the game. He still has some work to do. At the end of the day, however, he continues the game, which starts directly in the adaptive mode.

FIGS. 5 and 6 demonstrate why the emotionally adaptive system 1 is able to provide a more appropriate level of system feedback by being able to operate in the two modes. A lower dashed line 28 represents the lower threshold for the desired emotional state, and an upper dashed line 29 represents an upper threshold for the desired emotional state. A continuous line 30 represents the development of the actual game speed S over time. As can be seen, the boundaries of game speed corresponding to a desired emotional state develop over time as the user becomes used to a particular game speed and becomes more proficient. FIG. 6 shows how, in the long run, a more or less constant level is established. Because the system 1, at least in the calibration mode, constantly changes the level of at least one dimension of the system feedback, the development of the boundaries is tracked. The system is therefore able to aim for the middle of the range between the upper and lower threshold 28,29, making the adaptive mode last longer. Over a longer time period, fewer returns to the calibration mode are required, because the thresholds 28,29 are less subject to change.

Figure 8:
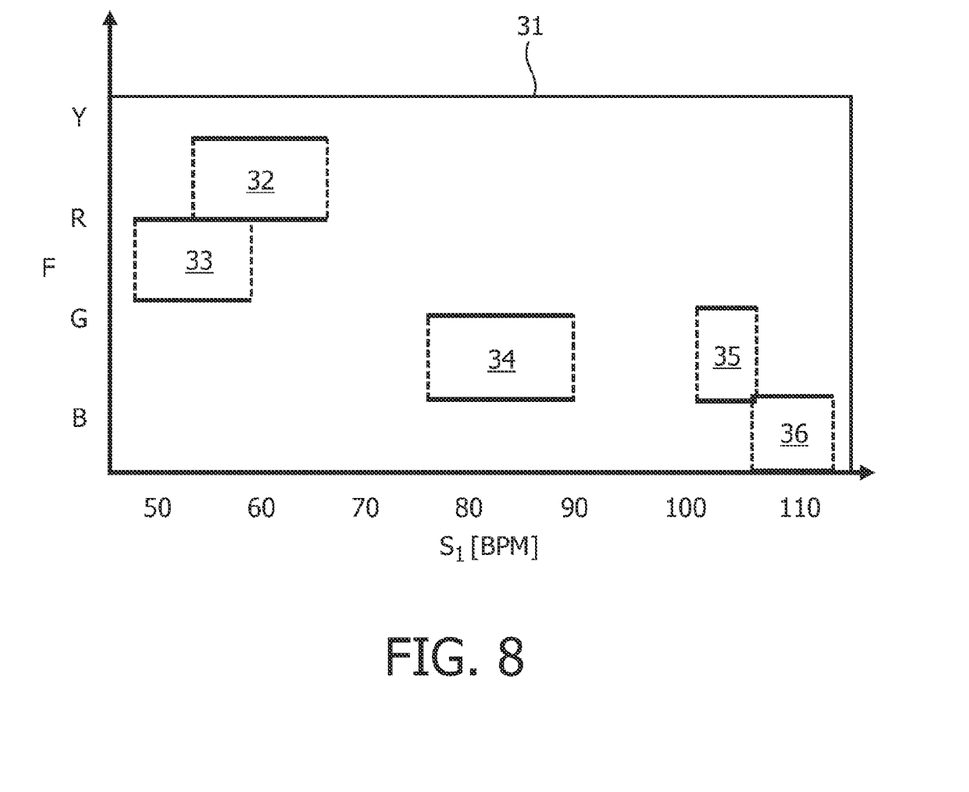
FIG. 8 is a diagram illustrating a further example of a user-interaction model, typical for atmosphere creation products.

FIG. 8 illustrates the interrelatedness of different dimensions of system feedback for the example of an ambient lighting system. One feedback parameter F in this case is the color, which can range from blue (level B) to yellow (level Y) via green (level G) and red (level R). In the illustrated example, the emotion signal data comprise heart rate values $S_1$. A wider area 31 corresponds to an undesired emotional state. Smaller areas 32-36 correspond to desired emotional states. Thresholds are indicated in dashed lines. Thus, the thresholds for the desired emotional state vary according to the color. The system 1 can adapt the intensity to remain within the boundaries of the desired emotional states. To discover these boundaries, the system 1 will vary the color and intensity independently of each other in the calibration mode. The use of both self-reports and emotional signal data to train a classifier that predicts the user's reaction makes for a more adaptive system than would be the case if the system 1 were simply to try to target a particular value of the heart rate parameter S.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

In one embodiment, the system according to the present invention is implemented in a single device. In another it comprises a service provider and a client. Alternatively, the system may comprise devices that are distributed and remotely located from each other.

The devices may be any of various consumer electronics devices such as a television set (TV set) with a cable, satellite or other link, a videocassette- or HDD-recorder, a home cinema system, a portable CD player, a remote control device such as an iPronto remote control, a cell phone, etc.

In an embodiment, the database 24 is populated with device-specific, user-generic data prior to first use. Thus, during the calibration phase, the data established for a different user or a hypothetical different user are gradually replaced by data based on self-reports and emotion data 16 from the actual current user of the emotionally adaptive system 1.

The invention claimed is:

1. A method of controlling influence on a user or a plurality of users by a rendering environment system including a processor and memory, using the processor repeatedly until a desired emotional state of the user is reached, wherein the processor is programed to perform the steps of:
   (A) calibrating the processor, including the steps of,
      (i) influencing the user in the rendering environment using varying levels of feedback;
      (ii) obtaining signal data representing one or more physiological conditions of the user in response to the influence caused by the varying levels of feedback;
      (iii) obtaining a user report from the user corresponding to the user's desired emotional state;
      (iv) saving the signal data and user report obtained by the processor into the memory; and
      (v) further influencing the user and predicting if the desired emotional state is reached and comparing the results of the prediction with the user report saved in memory;
      wherein, calibrating the processor is complete when the processor correctly predicts the user's desired emotional state obtained in a user report a minimum threshold number of times;
   (B) controlling a plurality of devices of the rendering environment having configurable settings to render the environment for automatically providing a system feedback;
   (C) obtaining signal data by the processor, the signal data comprising one or more physiological conditions of the user responsive to the system feedback during a predetermined period and storing the signal data into the memory;
   (D) generating a prediction of the user's desired emotional state and, based on that prediction, adapting the configurable settings of the plurality of devices to provide the system feedback in accordance with the obtained emotion data; and
   (E) influencing the user in the rendering environment using the configurable settings from the generating step.

2. The method according to claim 1, further comprising a step of saving the signal data obtained in Step (C) in a database stored in the memory.

3. The method according to claim 1, wherein, when the processor predicts the user's desired emotional state obtained in a user report below the minimum threshold number of times during the calibrating step, a level of at least one dimension of the feedback is constantly changed.

4. The method according to claim 3, wherein, the constantly changed level of at least one dimension of feedback is selected from a scanning sequence database.

5. The method of claim 1, wherein the one or more physiological conditions enable inference of a physiological state of the user.

6. The method of claim 1, wherein the emotion data further comprises thresholds corresponding to switch points at which the user switches between emotional states.

7. The method of claim 1, further comprising:
finding thresholds of the user's emotional state by selecting from a range of levels of the system feedback levels corresponding to the desired emotional state; and
keeping the level of the system feedback in a middle of the range of levels.

8. An emotionally adaptive system for controlling an influence on a user or a plurality of users by a rendering environment the system comprising:
at least one feedback device configured to influence the user using varying levels of feedback;
an input/output device configured to obtain signal data representing one or more physiological conditions of the user in response to the influence caused by the varying levels of feedback;
a user input device configured to obtain a user report from the user corresponding to the user's desired emotional state; and
a memory unit configured to store the signal data and the user report;
a processor configured to:
(A) perform a calibration of the emotional adaptive system, including
(i) with the at least one feedback device influencing the user in the rendering environment using varying levels of feedback;
(ii) with the input/output device obtaining signal data representing one or more physiological conditions of the user in response to the influence caused by the varying levels of feedback;
(iii) with the user input device obtaining a user report from the user corresponding to the user's desired emotional state;
(iv) saving the signal data and user report obtained by the processor into the memory unit; and
(v) further influencing the user and predicting if the desired emotional state is reached and comparing the results of the prediction with the user report saved in memory;
wherein, calibration is complete when the processor correctly predicts the user's desired emotional state obtained in a user report a minimum threshold number of times;
(B) controlling the at least one feedback device by adjusting configurable settings to render the environment for automatically providing a system feedback;
(C) obtaining signal data by the input/output device, the signal data comprising one or more physiological conditions of the user responsive to the system feedback during a predetermined period and storing the signal data into the memory unit;
(D) generating a prediction of the user's desired emotional state and, based on that prediction, adapting the configurable settings of the plurality of devices to provide the system feedback in accordance with the obtained emotion data; and
(E) influencing the user in the rendering environment using the configurable settings from the generating step.

9. The apparatus of claim 8, wherein the one or more physiological conditions enable inference of a physiological state of the user.

10. The apparatus of claim 8, wherein the emotion data further comprises thresholds corresponding to switch points at which the user switches between emotional states.

11. The apparatus of claim 8, wherein the processor is further configured to:
find thresholds of the user's emotional state by selecting from a range of levels of the system feedback levels corresponding to the desired emotional state; and
keep the level of the system feedback in a middle of the range of levels.

12. A non-transitory computer readable medium storing a computer program for controlling influence on a user or a plurality of users by a rendering environment, the rendering environment including a processor and memory, the computer program causing the processor in a computer to perform:
(A) a calibration of the computer program, including the steps of,
(i) influencing the user in the rendering environment using varying levels of feedback;
(ii) obtaining signal data representing one or more physiological conditions of the user in response to the influence caused by the varying levels of feedback;
(iii) obtaining a user report from the user corresponding to the user's desired emotional state;
(iv) saving the signal data and user report obtained by the processor into the memory: and
(v) further influencing the user and predicting if the desired emotional state is reached and comparing the results of the prediction with the user report saved in memory;
wherein, the calibration of the computer program is complete when the processor correctly predicts the user's desired emotional state obtained in a user report a minimum threshold number of times;
(B) a controlling step of controlling a plurality of devices of the rendering environment having configurable settings to render the environment for automatically providing a system feedback;
(C) an obtaining step of obtaining signal data by the processor, the signal data comprising one or more physiological conditions of the user responsive to the system feedback during a predetermined period and storing the signal data into memory;
(D) a generating step of generating a prediction of the user's desired emotional state and, based on that prediction, adapting the configurable settings of the plurality of devices to provide the system feedback in accordance with the obtained emotion data; and
(E) an influencing step of influencing the user in the rendering environment using the configurable settings from the generating step.

13. The non-transitory computer readable medium of claim 12, wherein the one or more physiological conditions enable inference of a physiological state of the user.

14. The non-transitory computer readable medium of claim 12, wherein the emotion data further comprises thresholds corresponding to switch points at which the user switches between emotional states.

15. The non-transitory computer readable medium of claim 12, wherein the processor is further configured to:
find thresholds of the user's emotional state by selecting from a range of levels of the system feedback corresponding to the desired emotional state; and
keep the level of the system feedback in a middle of the range of levels.

* * * * *